United States Patent
Muenter et al.

(10) Patent No.: US 7,564,880 B2
(45) Date of Patent: Jul. 21, 2009

(54) LASER INTRA-CAVITY ELECTRONIC WAVELENGTH TUNER

(75) Inventors: Steven E. Muenter, Van Nuys, CA (US); Harold N. Seiden, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 48 days.

(21) Appl. No.: 11/445,526

(22) Filed: Jun. 2, 2006

(65) Prior Publication Data

US 2007/0280310 A1    Dec. 6, 2007

(51) Int. Cl.
*H01S 3/10* (2006.01)
(52) U.S. Cl. ................ 372/20; 372/13; 372/9; 372/98; 372/99; 372/108
(58) Field of Classification Search ............ 372/13, 372/20, 9, 98, 99, 108
See application file for complete search history.

(56) References Cited

U.S. PATENT DOCUMENTS

| | | | |
|---|---|---|---|
| 3,566,303 A | | 2/1971 | De Maria |
| 3,790,898 A | | 2/1974 | Gudmendsen et al. |
| 4,586,184 A | * | 4/1986 | Hess ............................ 372/28 |
| 4,707,835 A | * | 11/1987 | Mocker ....................... 372/20 |
| 4,969,156 A | * | 11/1990 | Schiller et al. ................ 372/93 |
| 6,031,852 A | | 2/2000 | Thompson et al. |
| 6,563,845 B2 | * | 5/2003 | Kumkar ....................... 372/28 |
| 7,274,718 B2 | * | 9/2007 | Tan et al. ...................... 372/26 |

* cited by examiner

*Primary Examiner*—Minsun Harvey
*Assistant Examiner*—Kinam Park
(74) *Attorney, Agent, or Firm*—Rozenblat IP LLC

(57) ABSTRACT

An apparatus for adjusting the wavelength of a laser capable of lasing at multiple wavelengths by using a single acousto-optical modulator and a pair of optical reflectors inside a laser cavity. By adjusting the frequency and amplitude of the radio-frequency source to the acousto-optical modulator, undesired wavelengths are suppressed in the laser cavity, leaving appreciable gain only at the desired wavelength.

21 Claims, 2 Drawing Sheets

US 7,564,880 B2

LASER INTRA-CAVITY ELECTRONIC WAVELENGTH TUNER

BACKGROUND OF THE INVENTION

Many laser gain media are capable of lasing at different wavelengths. By designing a laser cavity in a particular manner, a desired wavelength can be selected from the multiple possible lasing wavelengths by suppressing the gain at undesired wavelengths. Typically, a laser design is fixed for only one wavelength, and once the laser cavity is built, it is not a simple matter to adjust the laser to lase at a different wavelength.

For example, a simple method for selecting a particular wavelength is to use mirrors that only efficiently reflect the desired wavelength. For instance, dielectrically coated mirrors can be used that reflect only a narrow range of wavelengths. While this method allows one to tune a laser to a single wavelength or a narrow range of wavelengths, the method is not ideal, because it does not allow the operator to adjust or tune the wavelength once the laser has been built. In order to change the operating wavelength of the laser, the entire system must be rebuilt. In addition, if the gain medium supports lasing at wavelengths that are closely spaced, the mirrors may reflect more than the desired wavelength.

Another option for selecting a single wavelength is to use diffractive optics, such as diffraction gratings within the laser cavity, often in a Littrow configuration. The undesired wavelengths are spatially separated and blocked, thereby introducing substantial losses in the laser cavity at the undesired wavelengths and allowing gain only at the desired wavelength. Lasers using diffractive optics in this manner can be tuned by rotating the diffraction grating relative to the incoming beam. This solution is not without its problems, however. Alignment of the grating can be problematic, and the stability of the system can be lacking because the optical components must physically move to tune the laser.

This invention provides an electronically-adjustable system for selecting different wavelengths from the same laser cavity configuration without the need to change the laser cavity configuration by using a single acousto-optical device and a pair of optical reflectors inside the laser cavity, thereby creating a stable, wavelength-adjustable laser.

SUMMARY OF THE INVENTION

A wavelength-adjustable laser of the present invention comprises a gain medium for amplifying a laser beam in a wavelength range; a first optical reflector; an acousto-optical modulator located between the gain medium and the first optical reflector such that the acousto-optical modulator diffracts a portion of the laser beam into a plurality of diffracted laser beams wherein each diffracted laser beam diffracts at a different angle from an optical axis formed by the laser beam based on the wavelength of the diffracted laser beam; a second optical reflector and a third optical reflector positioned about the optical axis such that only a selected diffracted laser beam from the plurality of diffracted laser beams is reflected off both the second optical reflector and the third optical reflector into the acousto-optical modulator; and an adjustable radio-frequency source coupled to the acousto-optical modulator wherein the wavelength of the selected diffracted laser beam is changed by adjusting the frequency of a radio signal emitted from the adjustable radio-frequency source.

A method for adjusting the wavelength of a laser of the present invention comprises the steps of positioning an acousto-optical modulator between a gain medium and a first optical reflector; coupling an adjustable radio-frequency source to the acousto-optical modulator; and positioning a second optical reflector and a third optical reflector about an optical axis formed by an undiffracted laser beam coming from the acousto-optical modulator.

The features, functions, and advantages can be achieved independently in various embodiments of the present inventions or may be combined in yet other embodiments.

DETAILED DESCRIPTION OF THE INVENTION

Figure 1:
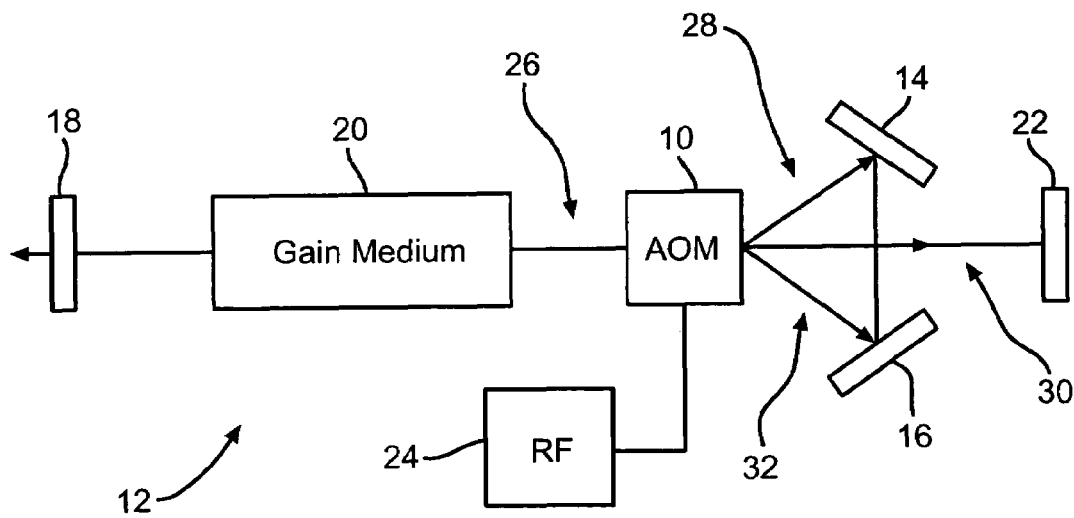
FIG. 1 is a schematic representation of a preferred form of the invention.

The present invention, as shown in FIG. 1, uses a single acousto-optical modulator 10 inside a laser cavity 12, along with two additional optical reflectors 14 and 16, to cause the laser cavity 12 to lase at a one of a number of possible wavelengths. The laser cavity 12 consists of a partially-reflecting mirror (or output coupler) 18, a gain medium 20 (such as an Argon-ion gas cell), and a high-reflecting mirror 22. Alternatively, another mirror, such as mirror 22, could act as the output coupler. The type of gain medium is not critical to this invention, and any of a number of common gain media can be used, such as dyes, gas cells, solid state crystals, glass, chemicals, or semiconductors. In the example of an Argon-ion gas cell gain medium, the gain medium can support lasing at a number of different wavelengths: 351 nm, 454.6 nm, 457.9 nm, 465.8 nm, 476.5 nm, 488.0 nm, 496.5 nm, 501.7 nm, 514.5 nm, and 528.7 nm.

Figure 2:
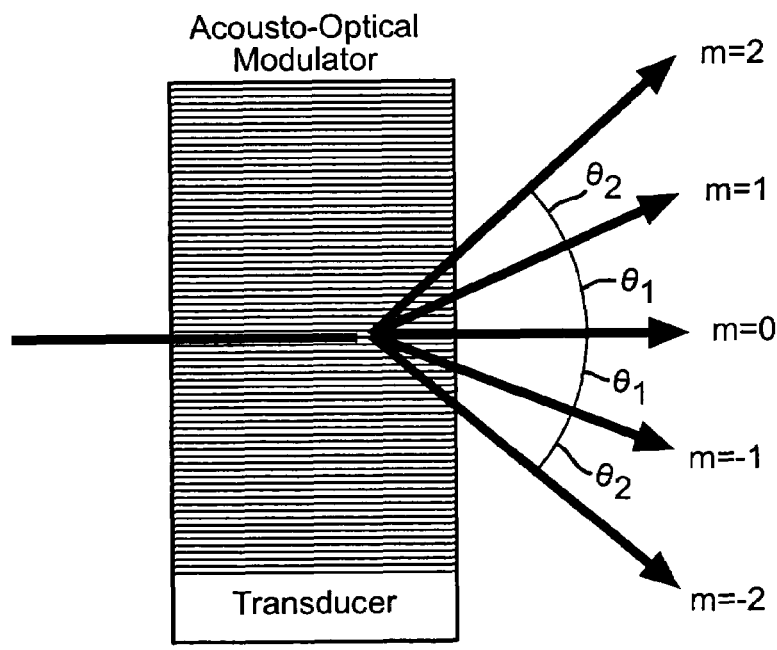
FIG. 2 is a schematic representation of an acousto-optical modulator.

In order to select one desired wavelength and suppress any undesired ones, the acousto-optical modulator 10 (for example, a Bragg cell) and two highly-reflecting mirrors 14 and 16 are inserted inside laser cavity 12. Bragg cell 10 is coupled to a radio-frequency source 24 that emits a radio signal whose frequency and amplitude can be varied. Such Bragg cells are common optical components that are available from a variety of sources. Bragg cells are comprised of a solid material, such as a crystal, quartz, or glass, with an piezoelectric transducer located on one end. A radio-frequency electrical signal, whose frequency and amplitude can be adjusted, drives the piezoelectric transducer, thereby creating a traveling acoustic wave inside the Bragg material. This acoustic wave creates regions of higher and lower indices of refraction inside the Bragg material, which can diffract light according to the Bragg equation:

$$\sin\theta = \frac{m\lambda}{\Lambda} \qquad \text{Eq. 1}$$

where θ is the angle that the diffracted beam emerges from the Bragg cell with respect to the undiffracted beam, λ is the wavelength of the laser beam, Λ is the acoustic wavelength inside the Bragg cell, and m is the integral order of diffraction (−2, −1, 0, 1, 2, etc.), as shown in FIG. 2. Thus, the diffracted angle of the laser beam passing through the Bragg cell depends on the ratio of the wavelength of the laser beam λ relative to the wavelength of the acoustic wave Λ in the Bragg cell.

In addition to being diffracted, the laser beam will experience a frequency (or wavelength) shift in the amount of the frequency of the acoustic wave in the Bragg cell:

$$\nu_{out} = \nu_{in} + m\nu_{acous} \qquad \text{Eq. 2}$$

where $\nu_{out}$ is the frequency-shifted frequency of the laser beam, $\nu_{in}$ is the original, unshifted frequency of the laser beam, m is the integral order of diffraction, and $\nu_{acous}$ is the acoustic frequency of the acoustic wave in the Bragg cell ($\nu_{acous} = V_{acous}/\Lambda$, where $V_{acous}$ is the speed of sound in the Bragg material). Because the frequency of the laser beam is directly related to its wavelength (c=λν, where c is the speed of light), the laser beam also shifts in wavelength:

$$\Delta\lambda = \lambda_{out} - \lambda_{in} = \lambda_{in}\left(\frac{1}{1+\frac{m\lambda_{in}\nu_{acous}}{c}} - 1\right) \qquad \text{Eq. 3}$$

where $\lambda_{out}$ is the wavelength-shifted wavelength of the laser beam, $\lambda_{in}$ is the original, unshifted wavelength of the laser beam, m is the integral order of diffraction, $\nu_{acous}$ is the acoustic frequency of the acoustic wave in the Bragg cell, and c is the speed of light.

Thus, for the positive first-order diffracted beam (m=1), the outgoing laser beam will be frequency upshifted by the acoustic frequency ($\nu_{acous}$) and wavelength downshifted by the amount in Equation 3. Similarly, for the negative first-order diffracted beam (m=−1), the outgoing laser beam will be frequency downshifted by the acoustic frequency ($\nu_{acous}$) and wavelength upshifted by the amount in Equation 3. Notably, the zero-order undiffracted beam (m=0) will not experience a frequency or wavelength shift.

In order to avoid a continual frequency (or wavelength) shift as the laser beam passes through the Bragg cell, the positive first-order diffracted beam can be returned through the Bragg cell along the path of the negative first-order diffracted beam, thereby exactly canceling the frequency (wavelength) shift. The laser will be frequency upshifted by $\nu_{acous}$ and then frequency downshifted by $\nu_{acous}$, for a zero net frequency shift.

Thus, in the preferred embodiment, the invention comprises adding a Bragg cell 10 with two highly-reflecting mirrors 14 and 16 inside the laser cavity 12. In order to preserve the symmetry and efficiency of the Bragg cell, the Bragg cell 10 is placed with its face nominally perpendicular to the incoming laser beam 26 from the gain medium (from the left in FIG. 1). As the laser beam passes through the Bragg cell 10, the positive first-order diffracted beam 28 (m=1) diffracts in one angle away (towards the top in FIG. 1) from the undiffracted beam 30 (m=0), while the negative first-order diffracted beam 32 (m=−1) diffracts in the same angle but in the opposite direction (towards the bottom in FIG. 1). The positive first-order diffracted beam will be frequency upshifted by the acoustic frequency in the Bragg cell, while the negative first-order diffracted beam will be frequency downshifted by the acoustic frequency. Whether the positive first-order beam emerges to the left or to the right of the undiffracted beam is not important for purposes of this invention.

The two highly-reflecting mirror 14 and 16 are placed symmetrically on either side of the undiffracted beam 30 such that the positive and negative first-order diffracted beams 28 and 32 will reflect onto each other and pass back through the Bragg cell 10 at the same angle they emerged from the Bragg cell 10. In this way, the optical path lengths for the positive and negative first-order diffracted beams 28 and 32 are identical and each frequency shift will be exactly canceled as the beams pass back through the Bragg cell 10.

Figure 3:
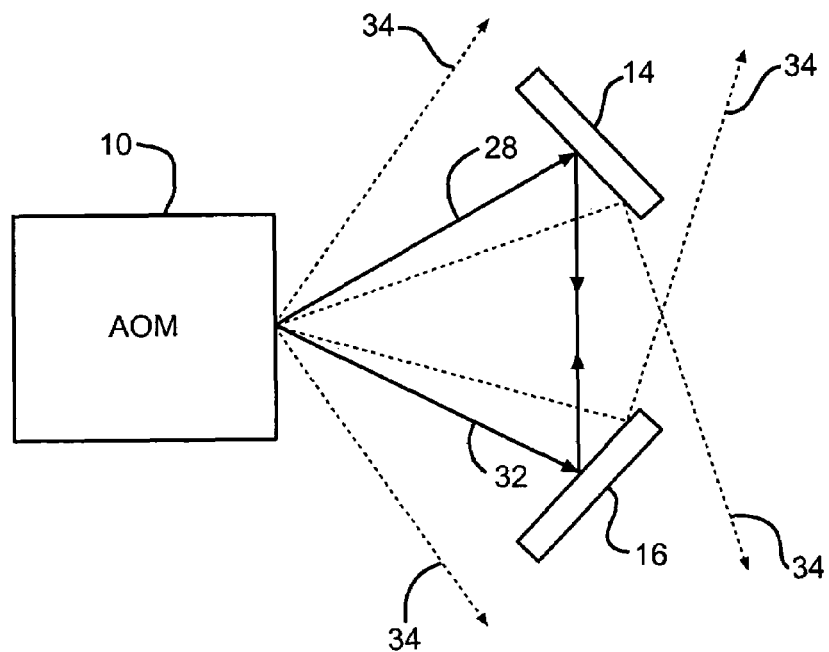
FIG. 3 is a schematic representation of the laser passing through the acousto-optical modulator.

By adjusting the frequency of the radio-frequency source 24 coupled to the Bragg cell 10, the angle of the first-order diffracted beams for a particular wavelength can be adjusted according to Equation 1, above. Mirrors 14 and 16 can be placed so that only the desired wavelength falls on them in such a way as to be reflected back into the Bragg cell 10 to form a closed optical path with the laser cavity 12. Undesired wavelengths will be diffracted at an angle such that they will entirely miss mirrors 14 and 16 or will strike mirrors 14 and 16 in such a way as not to be reflected back through Bragg cell 10, or will reflect back through Bragg cell 10 at an angle that deviates from the optical axis of the laser cavity 12. For example, in FIG. 3, the frequency of the radio-frequency source 24 to the Bragg cell 10 is adjusted such that desired wavelength is diffracted onto the middle of mirrors 14 and 16 (laser beams 28 and 32), while the undesired wavelengths are diffracted entirely off mirrors 14 and 16 (laser beams 34). The laser will only lase at those wavelengths whose gain for one round trip through the laser cavity 12 is equal to or greater than the round trip losses for that wavelength. In this way, the Bragg cell 10 and mirrors 14 and 16 introduce significant loss in the laser cavity 12 at undesired wavelengths, while introducing little or no loss at the desired wavelength. Alternatively, mirrors 14 and 16 can be positioned with additional mirrors or optical elements to accomplish the same effect of only allowing the desired wavelength to return through the Bragg cell 10 in a closed optical path within laser cavity 12.

Because the Bragg cell 10 is not perfectly efficient, some of the laser beam will not be diffracted and will remain in the zero-order. Thus, mirror 22 must remain in the laser cavity 12 to reflect the undiffracted laser beam 30 back into Bragg cell 10 to avoid losing light at the desired wavelength.

Figure 4:
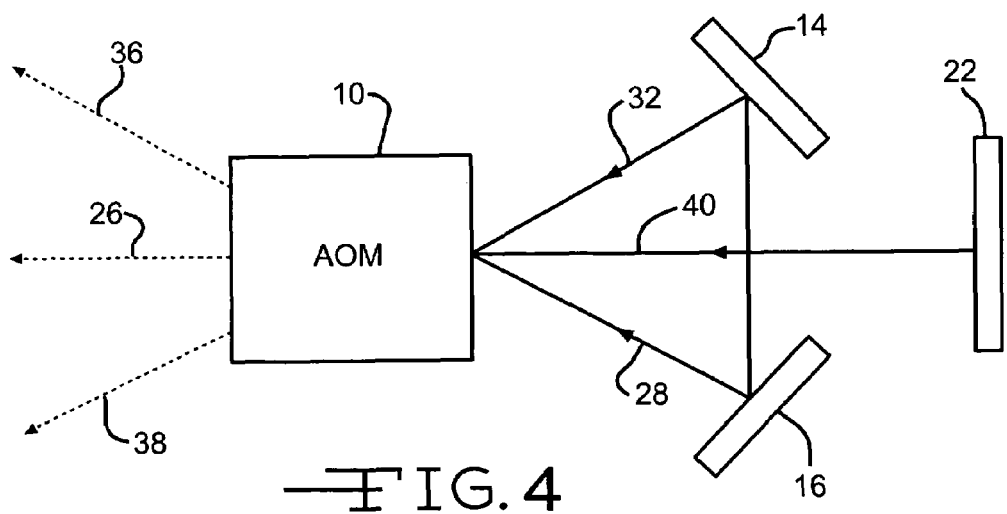
FIG. 4 is a schematic representation of the laser passing through the acousto-optical modulator.

In addition, because the Bragg cell 10 is not perfectly efficient, when the positive and negative first-order diffracted beams 28 and 32 return through the Bragg cell 10, some of these diffracted beams will not be diffracted again, but will pass straight through the Bragg cell 10 in an undiffracted order (beams 36 and 38), as shown in FIG. 4. Because the undiffracted beams 36 and 38 leave the laser cavity 12, they will introduce loss in the laser cavity 12 at the desired wavelength. In order to minimize this unwanted loss, the position of mirror 22 can be adjusted so that returning laser beam 40 to the Bragg cell 10 from mirror 22 will be exactly out of phase (and, thus, destructively interfere) with the laser beams returning from mirrors 28 and 32 to Bragg cell 10, thereby reducing the intensity of the undiffracted beams 36 and 38. Adjusting the amplitude of the radio-frequency source 24 coupled to the Bragg cell 10 adjusts the efficiency of the diffraction in the Bragg cell 10, and, therefore, the intensity of the diffracted laser beams 28 and 32. For a particular laser system, the amplitude of the radio-frequency source 24 should be adjusted so as to create sufficient loss in the undesired wavelengths to reduce or suppress the total gain at these wavelengths, while keeping the loss in the desired wavelength low enough that the laser beam at the desired wavelength experiences a net gain in the laser system. In this way, the desired wavelength will experience the most gain, and the laser will primarily lase at the desired wavelength.

By positioning mirrors 14, 16, and 22 in such a way that the optical path length from Bragg cell 10 to mirror 14 to mirror 16 back to Bragg cell 10 equals the optical path length from Bragg cell 10 to mirror 22 back to Bragg cell 10, the wavelength of the laser can be changed by simply adjusting the frequency of the radio-frequency source 24. Alternatively, if the optical path length from Bragg cell 10 to mirror 14 to mirror 16 back to Bragg cell 10 does not equal the optical path length from Bragg cell 10 to mirror 22 back to Bragg cell 10, the wavelength of the laser can be adjusted to only certain, supported wavelengths in the laser cavity 12.

In another embodiment of the invention, two wavelengths can be selected and amplified within the laser cavity 12 by adjusting the radio-frequency source 24 to be comprised of a combination of two different radio-frequencies signals. This combination of radio-frequency signals is then coupled to the Bragg cell 10, such that a combination of traveling acoustic waves are created in the Bragg cell 10. The first radio-frequency signal is adjusted such that one selected wavelength is diffracted by the Bragg cell 10 onto mirrors 14 and 16, as described above. The second radio-frequency signal is adjusted such that a second selected wavelength is diffracted by the Bragg cell 10 onto the same mirrors 14 and 16 and back into the Bragg cell 10. In this configuration, only the two desired wavelengths will be diffracted in such a way as to form a closed optical path in laser cavity 12. Because part of the laser at the second selected wavelength will be diffracted out of the laser cavity 12 by the first radio-frequency signal component of the traveling acoustic wave in the Bragg cell 10 and part of the laser at the first selected wavelength will be diffracted out of the laser cavity 12 by the second radio-frequency signal component of the traveling acoustic wave in the Bragg cell 10, the amplitude of both radio-frequency signals must be adjusted so as to allow net gain for both desired wavelengths in laser cavity 12 and net loss for every other undesired wavelength.

Because there is no need to physically move any components inside the laser cavity, the laser should be extremely stable, being insensitive to vibration and thermal effects, as well as being quickly and easily adjustable between different wavelengths.

We claim:

1. A wavelength-adjustable laser, comprising:
   a. a gain medium for amplifying a laser beam in a wavelength range;
   b. a first optical reflector;
   c. an acousto-optical modulator located between the gain medium and the first optical reflector such that the acousto-optical modulator diffracts a portion of the laser beam into a plurality of diffracted laser beams wherein each diffracted laser beam diffracts at a different angle from an optical axis formed by the laser beam based on the wavelength of the diffracted laser beam and a radio frequency signal used to drive the acousto-optical modulator;
   d. a second optical reflector and a third optical reflector positioned about the optical axis such that only a selected diffracted laser beam from the plurality of diffracted laser beams is reflected off both the second optical reflector and the third optical reflector into the acousto-optical modulator;
   e. an adjustable radio-frequency source coupled to the acousto-optical modulator wherein the wavelength of the selected diffracted laser beam is changed by adjusting the frequency of a radio signal emitted from the adjustable radio-frequency source;
   f. an amplitude of the adjustable radio frequency source having been selected to increase a loss in a zero order diffracted beam from the acousto-optical modulator for all wavelengths lying within a gain curve thereby having forced beam amplitude at these wavelengths below a laser threshold;
   g. an alignment of the acousto-optical modulator having been adjusted to equalize diffraction efficiencies of plus and minus first orders;
   h. an alignment of the second and third optical reflectors having been adjusted to return only first diffracted orders for the selected radio frequency drive frequencies, back into the acousto-optical modulator and through the gain medium, thereby having elevated the amplitude above the laser threshold and having allowed the selected optical frequencies to lase; and
   i. an alignment of the first optical reflector having been adjusted to return the zero order diffracted beam emerging from the acousto-optical modulator back along a same path.

2. The wavelength-adjustable laser of claim 1 wherein the amount of light diffracted by the acousto-optical modulator varies with adjustment of the amplitude of the radio signal emitted from the adjustable radio-frequency source.

3. The wavelength-adjustable laser of claim 1 including an output coupler positioned on the opposite side of the gain medium as the acousto-optical modulator.

4. The wavelength-adjustable laser of claim 1 wherein the first optical reflector is an output coupler.

5. The wavelength-adjustable laser of claim 1 wherein the acousto-optical modulator is a Bragg cell.

6. The wavelength-adjustable laser of claim 1 wherein the second optical reflector and the third optical reflector are positioned symmetrically about the optical axis.

7. The wavelength-adjustable laser of claim 1 wherein the optical path length from the acousto-optical modulator to the first optical reflector and back to the acousto-optical reflector is equal to the optical path length from the acousto-optical modulator to the second optical reflector to the third optical reflector to the acousto-optical reflector.

8. The wavelength-adjustable laser of claim 1 wherein the position of the first optical reflector relative to the acousto-optical modulator is adjustable.

9. The wavelength-adjustable laser of claim 1 wherein the radio signal emitted from the adjustable radio-frequency source comprises a first radio-frequency signal and a second radio-frequency signal.

10. The wavelength-adjustable laser of claim 9 wherein the selected diffracted laser beam comprises a first wavelength diffracted laser beam and a second wavelength diffracted laser beam.

11. The wavelength-adjustable laser of claim 10 wherein:
   the wavelength of the first wavelength diffracted laser beam is changed by adjusting the frequency of the first radio-frequency signal; and
   the wavelength of the second wavelength diffracted laser beam is changed by adjusting the frequency of the second radio-frequency signal.

12. A method for adjusting the wavelength of a laser comprising the steps of:
   (a) positioning an acousto-optical modulator between a gain medium and a first optical reflector;
   (b) coupling an adjustable radio-frequency source to the acousto-optical modulator and selecting an amplitude of the adjustable radio frequency source to increase a loss in a zero order diffracted beam from the acousto-optical modulator for all wavelengths lying within a gain curve to force beam amplitude at these wavelengths below a laser threshold; and (c) positioning a second optical reflector and a third optical reflector about an optical axis formed by an undiffracted laser beam coming from the acousto-optical modulator, and adjusting an alignment of the second and third optical reflectors to return only first diffracted orders for the selected radio frequency drive frequencies, back into the acousto-optical modulator and through the gain medium, and recombined with the zero order diffracted beam, in order to elevate the amplitude above the laser threshold thereby allowing the selected optical frequencies to lase.

13. The method of claim 12 further comprising positioning the second optical reflector and the third optical reflector such that only a selected wavelength of a diffracted laser beam coming from the acousto-optical modulator reflects off the second optical reflector and the third optical reflector into the acousto-optical modulator.

14. The method of claim 12 further comprising positioning the second optical reflector and the third optical reflector symmetrically about the optical axis.

15. The method of claim 12 further comprising adjusting the frequency of a radio signal emitted from the radio-frequency source to adjust the wavelength of the laser.

16. The method of claim 12 further comprising adjusting the amplitude of a radio signal emitted from the radio-frequency source to vary the amount of light diffracted by the acousto-optical modulator.

17. The method of claim 12 further comprising positioning an output coupler such that the gain medium lies between the output coupler and the acousto-optical modulator.

18. The method of claim 12 further comprising positioning the first optical reflector such that the optical path length from the acousto-optical modulator to the first optical reflector back to the acousto-optical reflector is equal to the optical path length from the acousto-optical modulator to the second optical reflector to the third optical reflector to the acousto-optical reflector.

19. The method of claim 12 further comprising adjusting the distance between the first optical reflector and the acousto-optical modulator.

20. The method of claim 12 further comprising emitting a first radio-frequency signal and a second radio-frequency signal from the adjustable radio-frequency source to the acousto-optical modulator.

21. The method of claim 20 further comprising selecting the frequency of the first radio-frequency signal and the frequency of the second radio-frequency signal such that two different wavelengths of the laser reflect off of the second optical reflector and the third optical reflector into the acousto-optical modulator.

* * * * *